United States Patent
Lee et al.

(10) Patent No.: US 9,769,478 B2
(45) Date of Patent: *Sep. 19, 2017

(54) SCALABLE VIDEO SIGNAL ENCODING/DECODING METHOD AND APPARATUS

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/908,274

(22) PCT Filed: Jul. 29, 2014

(86) PCT No.: PCT/KR2014/006934
§ 371 (c)(1),
(2) Date: Jan. 28, 2016

(87) PCT Pub. No.: WO2015/016578
PCT Pub. Date: Feb. 5, 2015

(65) Prior Publication Data
US 2016/0165260 A1 Jun. 9, 2016

(30) Foreign Application Priority Data

Jul. 30, 2013 (KR) .................. 10-2013-0090227
Jul. 28, 2014 (KR) .................. 10-2014-0095735

(51) Int. Cl.
*H04N 19/31* (2014.01)
*H04N 19/105* (2014.01)
(Continued)

(52) U.S. Cl.
CPC ......... *H04N 19/105* (2014.11); *H04N 19/124* (2014.11); *H04N 19/167* (2014.11);
(Continued)

(58) Field of Classification Search
CPC . H04N 19/58; H04N 19/513; H04N 19/00569
See application file for complete search history.

(56) References Cited

U.S. PATENT DOCUMENTS

2007/0286283 A1 12/2007 Yin et al.
2009/0003445 A1 1/2009 Ying et al.
(Continued)

FOREIGN PATENT DOCUMENTS

JP 2009-522888 A 6/2009
KR 10-2008-0037593 A 4/2008
(Continued)

OTHER PUBLICATIONS

Ohji Nakagami et al., "AHG9: On initialization process of reference picture lists for HEVC extensions", Document: JCTVC-M0081, Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013, pp. 1-11.
(Continued)

*Primary Examiner* — Sath V Perungavoor
*Assistant Examiner* — Patricia I Young
(74) *Attorney, Agent, or Firm* — IP Legal Services, LLC

(57) ABSTRACT

A scalable video signal decoding method according to the present invention decodes a corresponding picture of a reference layer corresponding to a current picture of a current layer, generates an inter-layer reference picture by up-sampling the decoded corresponding picture, generates a reference picture list including a temporal reference picture
(Continued)

and an inter-layer reference picture, and inter-predicting the current picture on the basis of the generated reference picture list.

4 Claims, 9 Drawing Sheets

(51) Int. Cl.

| | | |
|---|---|---|
| H04N 19/53 | (2014.01) | |
| H04N 19/58 | (2014.01) | |
| H04N 19/52 | (2014.01) | |
| H04N 19/167 | (2014.01) | |
| H04N 19/33 | (2014.01) | |
| H04N 19/40 | (2014.01) | |
| H04N 19/91 | (2014.01) | |
| H04N 19/30 | (2014.01) | |
| H04N 19/573 | (2014.01) | |
| H04N 19/124 | (2014.01) | |
| H04N 19/172 | (2014.01) | |
| H04N 19/176 | (2014.01) | |
| H04N 19/42 | (2014.01) | |
| H04N 19/61 | (2014.01) | |
| H04N 19/136 | (2014.01) | |
| H04N 19/187 | (2014.01) | |

(52) U.S. Cl.
CPC ......... *H04N 19/172* (2014.11); *H04N 19/176* (2014.11); *H04N 19/30* (2014.11); *H04N 19/33* (2014.11); *H04N 19/40* (2014.11); *H04N 19/439* (2014.11); *H04N 19/52* (2014.11); *H04N 19/53* (2014.11); *H04N 19/573* (2014.11); *H04N 19/58* (2014.11); *H04N 19/61* (2014.11); *H04N 19/91* (2014.11); *H04N 19/136* (2014.11); *H04N 19/187* (2014.11)

(56) References Cited

U.S. PATENT DOCUMENTS

| | | | |
|---|---|---|---|
| 2009/0285300 A1 | 11/2009 | Han et al. | |
| 2012/0044322 A1 | 2/2012 | Tian et al. | |
| 2012/0050475 A1 | 3/2012 | Tian et al. | |
| 2012/0056981 A1 | 3/2012 | Tian et al. | |
| 2013/0077677 A1 | 3/2013 | Wang et al. | |
| 2013/0077678 A1 | 3/2013 | Chen et al. | |
| 2013/0077679 A1 | 3/2013 | Wang et al. | |
| 2013/0077680 A1 | 3/2013 | Wang et al. | |
| 2013/0077681 A1 | 3/2013 | Chen et al. | |
| 2013/0077685 A1 | 3/2013 | Chen et al. | |
| 2013/0077687 A1 | 3/2013 | Wang et al. | |
| 2013/0128973 A1 | 5/2013 | Han et al. | |
| 2013/0155184 A1 | 6/2013 | Chen et al. | |
| 2013/0343461 A1 | 12/2013 | Lee et al. | |
| 2014/0079119 A1 | 3/2014 | Samuelsson et al. | |
| 2014/0119440 A1 | 5/2014 | Lee et al. | |
| 2014/0119441 A1 | 5/2014 | Lee et al. | |
| 2014/0286416 A1 | 9/2014 | Jeon et al. | |
| 2015/0139323 A1* | 5/2015 | Lee .................. | H04N 19/44 375/240.16 |
| 2015/0208093 A1 | 7/2015 | Lee et al. | |

FOREIGN PATENT DOCUMENTS

| | | |
|---|---|---|
| KR | 10-2009-0119434 A | 11/2009 |
| KR | 10-2013-0000334 | 1/2013 |
| WO | 2007/080033 A1 | 7/2007 |
| WO | 2012/033327 A2 | 3/2012 |
| WO | 2013/036041 A2 | 3/2013 |
| WO | 2013/062470 A1 | 5/2013 |
| WO | 2013/066045 A1 | 5/2013 |
| WO | 2013/070028 A1 | 5/2013 |

OTHER PUBLICATIONS

Jianle Chen et al., "SHVC Working Draft 2", Document: JCTVC-M1008_v3, Joint Collaborative Team on Video coding (JCT-VC) of ITU-T SG16 WP3 and ISO/IEC JTC1/SC29/WG11 13th Meeting: Incheon, KR, Apr. 18-26, 2013, pp. 1-60.

Yongjin Cho et al., "Inter-layer reference picture set initialization", Document: JCTVC-M0150, Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013, pp. 1-2.

Xiaoyu Xiu et al., "TE A2: Inter-layer reference picture placement", Document: JCTVC-L0051, Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, pp. 1-8.

* cited by examiner

FIG. 6

|  |  | LTRP | LTRP | LTRP | STRP | Current Picture |
|---|---|---|---|---|---|---|
| MaxPocLsb=32 | POC | 84 | ... 170 | ... 308 | ... 330 | 331 |
|  | POC LSB | 20 | 10 | 20 | 10 | 11 |
|  | POC MSB | 2 | 5 | 9 | 10 | 10 |

| LTRP INDEX | LTRP[2] | LTRP[1] | LTRP[0] |
|---|---|---|---|
| POC LSB | 20 | 10 | 20 |
| delta_poc_msb_cycle_lt | 3 | 4 | 1 |
| DeltaPocMSBCycelLt | 8 | 5 | 1 |
| pocLt | 84 | 170 | 308 |

Ex: LTRP[0]
pocLt=331−1−32−11+20=308

SCALABLE VIDEO SIGNAL ENCODING/DECODING METHOD AND APPARATUS

CROSS REFERENCE TO RELATED APPLICATIONS

This application is a National Stage Patent Application of PCT International Patent Application No. PCT/KR2014/006934 (filed on Jul. 29, 2014) under 35 U.S.C. §371, which claims priority to Korean Patent Application Nos. 10-2013-0090227 (filed on Jul. 30, 2013) and 10-2014-0095735 (filed on Jul. 28, 2014), the teachings of which are incorporated herein in their entireties by reference.

TECHNICAL FIELD

The present invention relates to a scalable video signal encoding/decoding method and device.

BACKGROUND ART

Recently, demand for high-resolution, high-quality video such as HD (High Definition) video and UHD (Ultra High Definition) video is increasing in various application fields. As video data has high-resolution, high-quality images, the amount of data is higher than for existing video data. Therefore, when the video data is transmitted using media such as existing wired and wireless broadband lines or is stored in existing storage media, transmission costs and storage costs increase. To solve these problems caused by the high-resolution, high-quality video data, high-efficiency video compression techniques may be used.

As video compression techniques, there are various techniques such as an inter-prediction technique for predicting the values of pixels included in a current picture from pictures that precede or follow the current picture, an intra-prediction technique for predicting the values of pixels in the current picture using information about the pixels included in the current picture, an entropy coding technique, in which the shortest code is assigned to the most frequently used value and the longest code is assigned to the least frequently used value, and the like. Video data may be effectively compressed using these video compression techniques, and may then be transmitted or stored.

Meanwhile, with the increase in demand for high-resolution video, demand for stereoscopic video content, as a new video service, is also increasing. Discussions on video compression techniques for effectively providing high-resolution and super-resolution stereoscopic video content are underway.

DISCLOSURE

Technical Problem

An object of the present invention is to provide a method and device for up-sampling a picture of a reference layer, upon encoding/decoding scalable video signals.

Another object of the present invention is to provide a method and device for constructing a reference picture list using an inter-layer reference picture, upon encoding/decoding scalable video signals.

A further object of the present invention is to provide a method and device for effectively deriving texture information of a current layer via inter-layer prediction, upon encoding/decoding scalable video signals.

Technical Solution

A scalable video signal decoding method and device according to the present invention is characterized by decoding a corresponding picture of a reference layer that corresponds to a current picture of a current layer, generating an inter-layer reference picture by up-sampling the decoded corresponding picture, generating a reference picture list including a temporal reference picture and the inter-layer reference picture, and performing inter-prediction of the current picture based on the reference picture list.

The temporal reference picture according to the present invention may include at least one of a first short-term reference picture, a second short-term reference picture, and a long-term reference picture.

The first short-term reference picture according to the present invention may mean a short-term reference picture having a Picture Order Count (POC) value less than that of the current picture, and the second short-term reference picture may mean a short-term reference picture having a POC value greater than that of the current picture.

The reference picture list according to the present invention may include at least one of reference picture list 0 and reference picture list 1, and the reference picture list 0 may be constructed in a sequence of the first short-term reference picture, the inter-layer reference picture, the second short-term reference picture, and the long-term reference picture, and the reference picture list 1 is constructed in a sequence of the second short-term reference picture, the inter-layer reference picture, the first short-term reference picture, and the long-term reference picture.

A position of the inter-layer reference picture in the reference picture list 0 or the reference picture list 1 according to the present invention may be specified based on a list order index.

A scalable video signal encoding method and device according to the present invention is characterized by decoding a corresponding picture of a reference layer that corresponds to a current picture of a current layer, generating an inter-layer reference picture by up-sampling the decoded corresponding picture, generating a reference picture list including a temporal reference picture and the inter-layer reference picture, and performing inter-prediction of the current picture based on the reference picture list.

The temporal reference picture according to the present invention may include at least one of a first short-term reference picture, a second short-term reference picture, and a long-term reference picture.

The first short-term reference picture according to the present invention may mean a short-term reference picture having a Picture Order Count (POC) value less than that of the current picture, and the second short-term reference picture may mean a short-term reference picture having a POC value greater than that of the current picture.

The reference picture list may include at least one of reference picture list 0 and reference picture list 1, and the reference picture list 0 may be constructed in a sequence of the first short-term reference picture, the inter-layer reference picture, the second short-term reference picture, and the long-term reference picture, and the reference picture list 1 may be constructed in a sequence of the second short-term reference picture, the inter-layer reference picture, the first short-term reference picture, and the long-term reference picture.

A position of the inter-layer reference picture in the reference picture list 0 or the reference picture list 1 according to the present invention is specified based on a list order index.

Advantageous Effects

In accordance with the present invention, a picture of a reference layer may be effectively up-sampled.

In accordance with the present invention, a reference picture list including an inter-layer reference picture may be effectively constructed.

In accordance with the present invention, texture information of a current layer may be effectively derived via inter-layer prediction.

DESCRIPTION OF DRAWINGS

FIG. 6 illustrates a method for specifying a long-term reference picture according to an embodiment to which the present invention is applied;

BEST MODE

Figure 1:
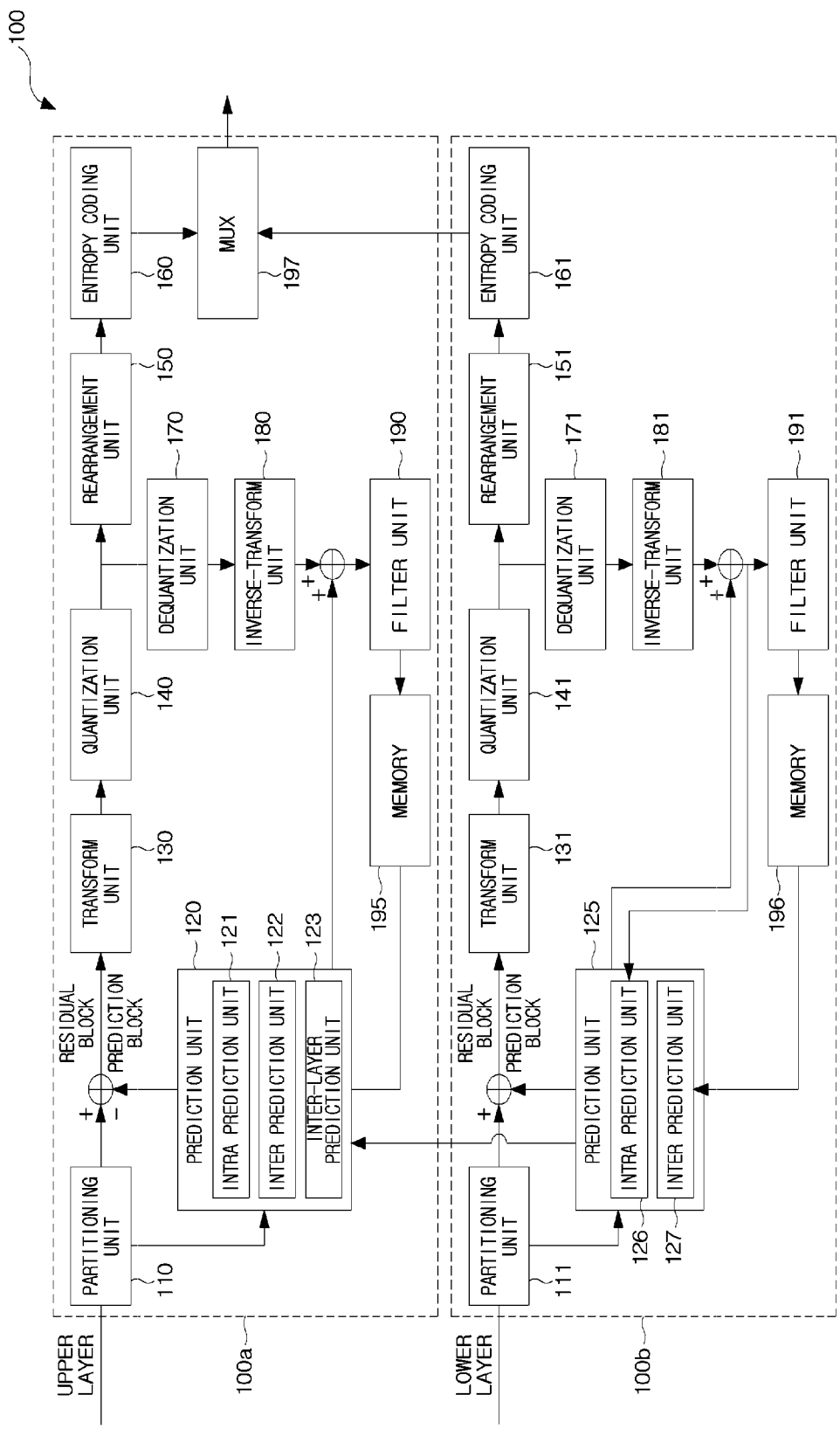
FIG. 1 is a block diagram schematically showing an encoding device according to an embodiment of the present invention.

A scalable video signal decoding method and device according to the present invention is characterized by decoding a corresponding picture of a reference layer that corresponds to a current picture of a current layer, generating an inter-layer reference picture by up-sampling the decoded corresponding picture, generating a reference picture list including a temporal reference picture and the inter-layer reference picture, and performing inter-prediction of the current picture based on the reference picture list.

The temporal reference picture according to the present invention may include at least one of a first short-term reference picture, a second short-term reference picture, and a long-term reference picture.

The first short-term reference picture according to the present invention may mean a short-term reference picture having a Picture Order Count (POC) value less than that of the current picture, and the second short-term reference picture may mean a short-term reference picture having a POC value greater than that of the current picture.

The reference picture list according to the present invention may include at least one of reference picture list 0 and reference picture list 1, and the reference picture list 0 may be constructed in a sequence of the first short-term reference picture, the inter-layer reference picture, the second short-term reference picture, and the long-term reference picture, and the reference picture list 1 is constructed in a sequence of the second short-term reference picture, the inter-layer reference picture, the first short-term reference picture, and the long-term reference picture.

A position of the inter-layer reference picture in the reference picture list 0 or the reference picture list 1 according to the present invention may be specified based on a list order index.

A scalable video signal encoding method and device according to the present invention is characterized by decoding a corresponding picture of a reference layer that corresponds to a current picture of a current layer, generating an inter-layer reference picture by up-sampling the decoded corresponding picture, generating a reference picture list including a temporal reference picture and the inter-layer reference picture, and performing inter-prediction of the current picture based on the reference picture list.

The temporal reference picture according to the present invention may include at least one of a first short-term reference picture, a second short-term reference picture, and a long-term reference picture.

The first short-term reference picture according to the present invention may mean a short-term reference picture having a Picture Order Count (POC) value less than that of the current picture, and the second short-term reference picture may mean a short-term reference picture having a POC value greater than that of the current picture.

The reference picture list may include at least one of reference picture list 0 and reference picture list 1, and the reference picture list 0 may be constructed in a sequence of the first short-term reference picture, the inter-layer reference picture, the second short-term reference picture, and the long-term reference picture, and the reference picture list 1 may be constructed in a sequence of the second short-term reference picture, the inter-layer reference picture, the first short-term reference picture, and the long-term reference picture.

A position of the inter-layer reference picture in the reference picture list 0 or the reference picture list 1 according to the present invention is specified based on a list order index.

Mode for Invention

Hereinafter, preferred embodiments of the present invention will be described in detail with reference to the attached drawings. The terms or words used in the present specification and claims should not be construed as being limited to ordinary meanings or dictionary definitions. The present invention should be understood to have meanings and concepts coping with the technical spirit of the present invention based on the principle that an inventor can appropriately define the concepts of terms in order to best describe his or her invention. Therefore, the embodiments described in the specification and the configurations illustrated in the drawings are merely preferred examples and do not exhaustively present the technical spirit of the present invention. Accordingly, it should be appreciated that there may be various equivalents and modifications that can replace the embodiments and the configurations at the time at which the present application is filed.

In this specification, when it is said that one element is 'connected' or 'coupled' with another element, it may mean that the one element may be directly connected or coupled with the other element and a third element may be 'connected' or 'coupled' between the two elements. Furthermore, in this specification, when it is said that a specific element is 'included', it may mean that elements other than the specific element are not excluded and that additional elements may be included in the embodiments of the present invention or the scope of the technical spirit of the present invention.

Terms such as 'first' and 'second' may be used to describe various elements, but the elements are not restricted by the terms. The terms are used only to distinguish one element from the other element. For example, a first element may be named a second element without departing from the scope of the present invention. Likewise, a second element may be named a first element.

Furthermore, element modules described in the embodiments of the present invention are independently shown in order to indicate different and characteristic functions, but this does not mean that each of the element modules is formed of a separate piece of hardware or software. That is, the element modules are arranged and included for convenience of description, and at least two of the element modules may form one element module or one element module may be divided into a plurality of element modules to perform their own functions. An embodiment in which the element modules are integrated and an embodiment in which the element modules are separated are included in the scope of the present invention, unless it departs from the essence of the present invention.

Furthermore, in the present invention, some elements are not essential elements for performing essential functions, but may be optional elements for improving only performance. The present invention may be implemented using only essential elements for implementing the essence of the present invention other than elements used merely to improve performance, and a structure including only essential elements, but not optional elements used only to improve performance, is included in the scope of the present invention.

Video encoding and decoding that supports a multi-layer bitstream is called scalable video coding. Because there is a strong correlation between the multiple layers, when prediction is performed using this correlation, duplicate elements may be removed and video encoding performance may be improved. Predicting the current layer using information about another layer is referred to as inter-layer prediction.

The multi-layers may have different resolutions, and the resolution may mean at least one of a spatial resolution, a temporal resolution, and image quality. At the time of inter-layer prediction, resampling such as up-sampling or down-sampling of a layer may be performed in order to adjust a resolution.

FIG. 1 is a block diagram schematically illustrating an encoding device according to an embodiment of the present invention.

An encoding device 100 according to the present invention includes an encoding unit 100a for an upper layer and an encoding unit 100b for a lower layer.

The upper layer may be called a current layer or an enhancement layer, and the lower layer may be called an enhancement layer having resolution lower than that of the upper layer, a base layer or a reference layer. At least one of the spatial resolution, temporal resolution based on a frame rate, color format, and image quality based on a quantization step size may differ between the upper layer and the lower layer. When a change of resolution is required for inter-layer prediction, up-sampling or down-sampling of the layer may be performed.

The encoding unit 100a for the upper layer may include a partitioning unit 110, a prediction unit 120, a transform unit 130, a quantization unit 140, a rearrangement unit 150, an entropy coding unit 160, an inverse quantization unit 170, an inverse-transform unit 180, a filter unit 190, and memory 195.

The encoding unit 100b for the lower layer may include a partitioning unit 111, a prediction unit 125, a transform unit 131, a quantization unit 141, a rearrangement unit 151, an entropy coding unit 161, an inverse quantization unit 171, an inverse-transform unit 181, a filter unit 191, and memory 196.

The encoding unit may be implemented by a video encoding method described in an embodiment of the present invention, which will be described below, but the operations of some parts may not be performed in order to reduce the complexity of the encoding device or to enable fast real-time encoding. For example, rather than a method in which all intra-prediction mode methods are used to select the optimal intra-encoding method, a method in which one is selected from among a limited number of intra-prediction modes and the selected one is set as the final intra-prediction mode may be performed for real-time encoding when the prediction unit performs intra-prediction. In another example, a prediction block used for intra-prediction or inter-prediction may have a limited shape.

The unit of a block processed in the encoding device may be a coding unit for performing coding, a prediction unit for performing prediction, or a transform unit for performing transformation. The coding unit, the prediction unit, and the transform unit may be represented as CU, PU, and TU, respectively.

Each of the partitioning units 110 and 111 may partition a layer by partitioning a layer picture into multiple combinations of coding blocks, prediction blocks, and transform blocks, and by selecting one combination of coding blocks, prediction blocks, and transform blocks based on a predetermined reference (for example, a cost function). For example, in order to partition a layer picture into coding units, a recursive tree structure such as a QuadTree structure may be used. Hereinafter, in an embodiment of the present invention, a coding block may mean not only a block for encoding but also a block for decoding.

A prediction block may be a unit for performing prediction, such as intra-prediction or inter-prediction. A block for intra-prediction may be a block having the form of a square, such as 2N×2N or N×N. As a block for inter-prediction, there are a block in the form of a square, such as 2N×2N and N×N, a block in the form of a rectangle, such as 2N×N and N×2N, and a block having an asymmetric form, obtained by a prediction block partitioning method using Asymmetric Motion Partitioning (AMP). The transform unit 115 may use different transform methods depending on the form of the prediction block.

Each of the prediction units 120 and 125 of the encoding units 100a and 100b may include an intra-prediction unit 121 or 126 for performing intra-prediction and an inter-prediction unit 122 or 127 for performing inter-prediction. The prediction unit 120 of the encoding unit 100a for the upper layer may further include an inter-layer prediction unit 123, which performs prediction of the upper layer using the information relating to the lower layer.

Each of the prediction units 120 and 125 may determine whether to perform inter-prediction or intra-prediction of a prediction block. When intra-prediction is performed, an intra-prediction mode is determined based on a prediction block, and a process for processing intra-prediction based on the determined intra-prediction mode may be performed based on a transform block. A residual (residual block) between the generated prediction block and the original block may be input to the transform units 130 and 131. Also, the prediction mode information used for prediction, motion information, and the like are encoded along with the residual by the entropy coding unit 130, and may be transmitted to the decoding device.

When a Pulse Code Modulation (PCM) mode is used, the original block may be encoded unchanged without performing prediction using the prediction units 120 and 125, and may be transmitted to a decoding unit.

Each of the intra-prediction units 121 and 126 may generate an intra-predicted block based on reference pixels located around the current block (the prediction target block). In the intra-prediction method, the intra-prediction mode may have a directional prediction mode, which uses reference pixels according to the prediction direction, and a non-directional mode, which does not consider a prediction direction. The mode for predicting luma information may be different from the mode for predicting chroma information. Intra-prediction mode, obtained by predicting luma information, or the predicted luma information may be used to predict chroma information. Meanwhile, if the reference pixels are not available, a prediction block may be generated by replacing the unavailable reference pixels with other pixels.

A prediction block may include multiple transform blocks. If the size of a prediction block is the same as the size of a transform block when performing intra-prediction, intra-prediction of the prediction block may be performed based on a left pixel, an upper-left pixel, and an upper pixel of the prediction block. However, as the time of intra-prediction, when the sizes of the prediction block and the transform block are different and multiple transform blocks are included inside the prediction block, neighboring pixels adjacent to the transform blocks are used as reference pixels to perform the intra-prediction. Here, the neighboring pixels adjacent to the transform block may include at least one of neighboring pixels adjacent to the prediction block and previously decoded pixels in the prediction blocks.

However, if the size of a prediction block is different from that of a transform block when performing intra-prediction and thus the prediction block includes multiple transform blocks, intra-prediction may be performed based on reference pixels determined based on the transform block.

The intra-prediction method may generate a prediction block after applying a Mode-Dependent Intra Smoothing (MDIS) filter to reference pixels according to the intra-prediction mode. The type of MDIS filter applied to the reference pixels may vary. The MDIS filter is an additional filter applied to an intra-predicted block generated by performing intra-prediction, and may be used for reducing a residual between reference pixels and the intra-predicted block, generated after performing prediction. When MDIS filtering is performed, different filtering may be performed on reference pixels and on some columns included in the intra-predicted block according to the direction of the intra-prediction mode.

Each of the inter-prediction units 122 and 127 may perform prediction by referring to the information about a block included in at least one of the picture preceding and the picture following the current picture. Each of the inter-prediction units 122 and 127 may include a reference picture interpolation unit, a motion prediction unit, and a motion compensation unit.

The reference picture interpolation unit may receive reference picture information from memory 195 or 196 and may generate information about a pixel, which is smaller than an integer pixel, from the reference picture. For a luma pixel, a DCT-based 8-tap interpolation filter, which differently sets filter coefficients to generate information about a pixel that is smaller than an integer pixel in units of ¼ pixels, may be used. For chroma signals, a DCT-based 4-tap interpolation filter, which differently sets filter coefficients to generate information about a pixel that is smaller than an integer pixel in units of ⅛ pixels, may be used.

Each of the inter-prediction units 122 and 127 may perform motion prediction based on the reference picture interpolated by the reference picture interpolation unit. As a method for calculating a motion vector, various methods, such as a Full search-based Block Matching Algorithm (FBMA), a Three-Step Search (TSS) algorithm, and a New Three-Step Search (NTS) Algorithm, may be used. The motion vector may have a motion vector value corresponding to ½ or ¼ of the interpolated pixel. Each of the inter-prediction units 122 and 127 may perform prediction on a current block using any one of various inter-prediction methods.

As the inter-prediction method, any of various methods such as a skip method, a merge method, and a Motion Vector Prediction (MVP) method may be used.

In inter-prediction, motion information, that is, information about a reference index, a motion vector, and a residual signal, is entropy-coded and then transferred to the decoding unit. When a skip mode is applied, a residual signal is not generated, and thus a procedure for transforming and quantizing a residual signal may be omitted.

The inter-layer prediction unit 123 performs inter-layer prediction for predicting an upper layer using information about the lower layer. The inter-layer prediction unit 123 may perform inter-layer prediction using the texture information, motion information, etc. of the lower layer.

The inter-layer prediction may be performed by setting the picture of the lower layer as a reference picture and performing prediction on the current block of the upper layer using motion information in the picture of the lower layer (reference layer). The picture of the reference layer, used as a reference picture in the inter-layer prediction, may be a picture that is sampled so as to match the resolution of the current layer. Also, the motion information may include a motion vector and a reference index. In this case, the motion vector value for the picture of the reference layer may be set to (0.0)

As an example of the inter-layer prediction, a prediction method that uses the picture of a lower layer as a reference picture is described, but the present invention is not limited to this. The inter-layer prediction unit 123 may additionally perform inter-layer texture prediction, inter-layer motion prediction, inter-layer syntax prediction, inter-layer residual prediction, and the like.

The inter-layer texture prediction may derive the texture of the current layer based on the texture of the reference layer. The texture of the reference layer may be sampled to match the resolution of the current layer, and the inter-layer prediction unit 123 may predict the texture of the current layer based on the sampled texture of the reference layer.

The inter-layer motion prediction may derive the motion vector of the current layer based on the motion vector of the reference layer. In this case, the motion vector of the reference layer may be scaled to match the resolution of the current layer. The inter-layer syntax prediction may predict the syntax of the current layer based on the syntax of the reference layer. For example, the inter-layer prediction unit 123 may use the syntax of the reference layer as the syntax of the current layer. Also, the inter-layer residual prediction may reconstruct the picture of the current layer using the residual between the restored picture of the reference layer and the restored picture of the current layer.

A residual block including residual information, which is the difference between the prediction block generated by each of the prediction units 120 and 125 and the reconstructed block of the prediction block, is generated, and the residual block is input to the corresponding transform unit 130 or 131. Each of the transform units 130 and 131 may transform the residual block using a transform method such as a Discrete Cosine Transform (DCT) or Discrete Sine Transform (DST). Whether to apply DCT or DST to transform the residual block may be determined based on the intra-prediction mode information of the prediction block used to generate the residual block and the size information of the prediction block. That is, each of the transform units 130 and 131 may use different transform methods depending on the size of the prediction block and the prediction method.

Each of the quantization units 140 and 141 may quantize values transformed in the frequency domain by the corresponding transform unit 130 or 131. The quantization coefficients may change depending on the type of block or the importance of the pictures. The value calculated by the quantization unit 140 or 141 may be provided to the inverse-quantization unit 170 or 17 and the rearrangement unit 150 or 151.

Each of the rearrangement units 150 and 151 may rearrange coefficient values of the quantized residual value. The rearrangement unit 150 or 151 may change a 2D block format coefficient to a 1D vector format coefficient using a coefficient scanning method. For example, the rearrangement unit 150 or 151 may change the 2D block format coefficient to a 1D vector format coefficient by scanning coefficients ranging from a DC coefficient to a high-frequency band coefficient using a zigzag scanning method. Depending on the size of the transform block and on the intra-prediction mode, a vertical scanning method for scanning 2D block format coefficients in a column direction and a horizontal scanning method for scanning 2D block format coefficients in a row direction, rather than the zigzag scanning method, may be used. That is, the determination of which one of the zigzag scanning, vertical scanning, and horizontal scanning methods is to be used may be made depending on the size of the transform block and the intra-prediction mode.

Each of the entropy coding units 160 and 161 may perform entropy coding based on the values calculated by the rearrangement unit 150 or 151. The entropy coding may be implemented using, for example, various coding methods such as Exponential Golomb, Context-Adaptive Variable Length Coding (CAVLC), and Context-Adaptive Binary Arithmetic Coding (CABAC).

The entropy coding units 160 and 161 may perform entropy coding based on a predetermined coding method by receiving various information, such as residual coefficient information and block type information of a coding block, prediction mode information, partition unit information, prediction block information and transmission unit information, motion vector information, reference frame information, interpolation information for a block, filtering information, and the like, from the rearrangement units 150 and 151 and the prediction units 120 and 125. Also, the entropy coding units 160 and 161 may entropy-code the coefficient value of a coding unit, input from the rearrangement units 150 and 151.

Each of the entropy coding units 160 and 161 may encode the intra-prediction mode information of the current block by binary-coding the intra-prediction mode information. The entropy coding units 160 and 161 may include a codeword mapping unit for the binary coding, and may perform the binary coding differently depending on the size of the prediction block for intra-prediction. The codeword mapping unit may adaptively generate a codeword mapping table through a binary coding operation, or may have a previously generated mapping table. In another embodiment, the entropy coding units 160 and 161 may represent the intra-prediction mode information about the current block using a code-num mapping unit for performing code-num mapping and a codeword mapping unit for performing codeword mapping. The code-num mapping unit and the codeword mapping unit may generate a code-num mapping table and a codeword mapping table, respectively, or may respectively have a previously generated code-num mapping table and codeword mapping table.

Each of the inverse quantization units 170 and 171 and the inverse transform unit 180 or 181 may inverse-quantize the values quantized by the quantization unit 140 or 141 and inverse-transform the values transformed by the transform unit 130 or 131. The residual value generated by the inverse quantization unit 170 or 171 and the inverse transform unit 180 or 181 may be combined with the prediction block predicted by the motion estimation unit, the motion compensation unit, and the intra-prediction unit, which are included in the prediction unit 120 or 125, and thus a reconstructed block may be generated.

Each of the filter units 190 and 191 may include at least one of a deblocking filter and an offset correction unit.

The deblocking filter may remove block distortion, generated due to the boundaries between blocks, in the reconstructed picture. Whether to perform deblocking, namely, whether to apply the deblocking filter to the current block, may be determined based on the pixels included in some rows or columns of the block. When the deblocking filter is applied to a block, a strong filter or a weak filter may be applied according to the required strength of deblocking filtering. Also, in applying the deblocking filter, when vertical filtering and horizontal filtering are performed, the vertical filtering and the horizontal filtering may be processed in parallel.

The offset correction unit may correct an offset between the picture on which deblocking is performed and the original picture in pixel units. In order to perform the offset correction on a specific picture, a method in which the pixels included in the picture are divided into certain areas, the area to which an offset is to be applied is determined, and the offset is applied to the area may be used, or a method in which the offset is applied in consideration of the information about the edge of each pixel may be used.

Each of the filter units 190 and 191 may be implemented using only a deblocking filter, or using both a deblocking filter and offset correction, rather than using all of a deblocking filter and offset correction.

Each of the memory 195 and 196 may store the reconstructed block or pictures calculated by the filter unit 190 or 191, and the reconstructed block and pictures stored in the memory may be provided to the prediction unit 120 or 125 when intra-prediction is performed.

Information output from the entropy coding unit 100*b* of the lower layer and information output from the entropy coding unit 100*a* of the upper layer are multiplexed by the MUX 197, and may then be output in the form of a bitstream.

The MUX 197 may be included in the encoding unit 100*a* of the upper layer or the encoding unit 100*b* of the lower layer, or may be implemented as a separate device or module, unlike the encoding unit 100.

Figure 2:
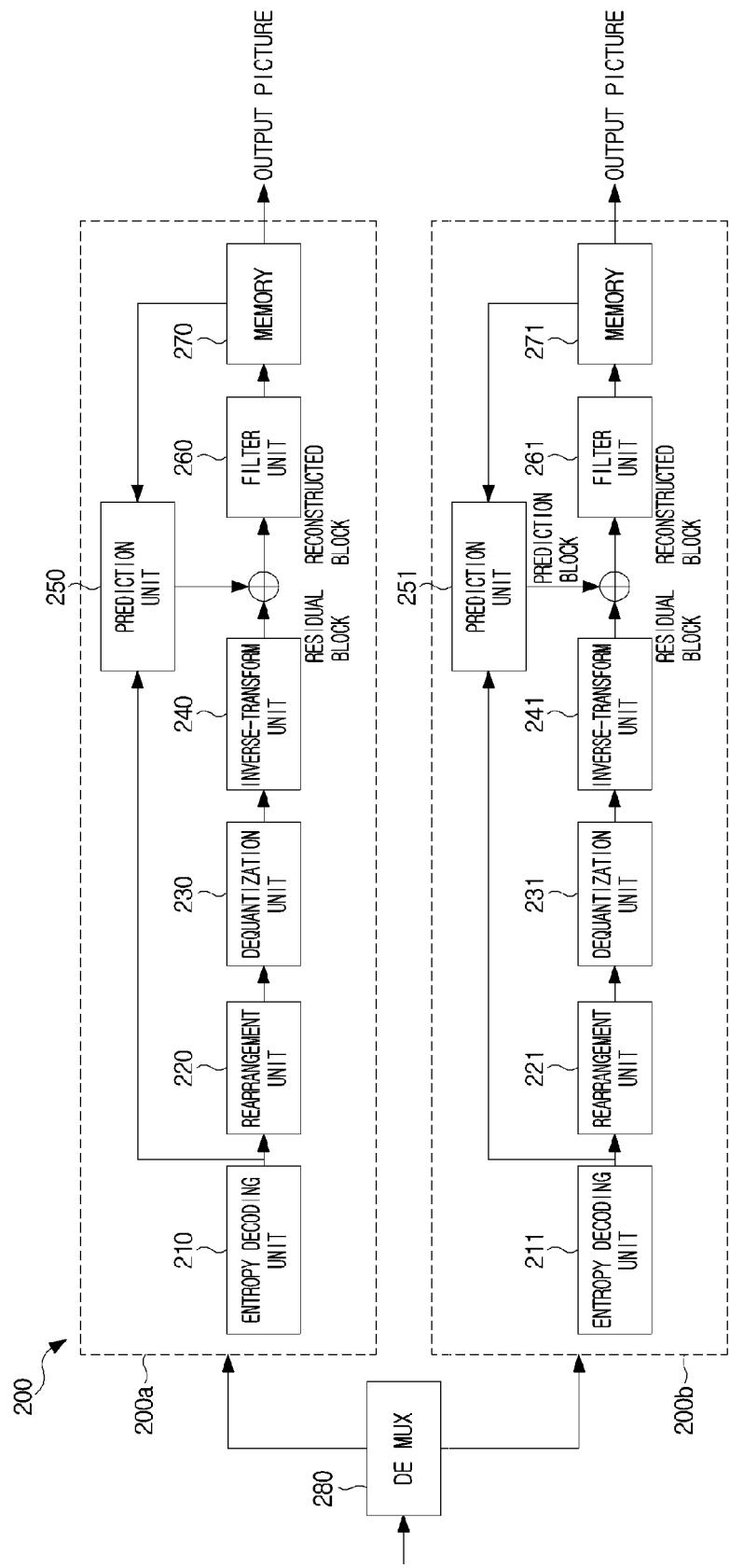
FIG. 2 is a block diagram schematically showing a decoding device according to an embodiment of the present invention.

FIG. 2 is a block diagram schematically showing a decoding device according to an embodiment of the present invention.

As shown in FIG. 2, a decoding device 200 includes a decoding unit 200*a* of an upper layer and a decoding unit 200*b* of a lower layer.

The decoding unit 200*a* of the upper layer may include an entropy decoding unit 210, a rearrangement unit 220, an inverse-quantization unit 230, an inverse-transform unit 245, a prediction unit 250, a filter unit 260, and memory 270.

The decoding unit 200*b* of the lower layer may include an entropy decoding unit 211, a rearrangement unit 221, an inverse-quantization unit 231, an inverse-transform unit 241, a prediction unit 251, a filter unit 261, and memory 271.

When a bitstream including multiple layers is transmitted from the encoding device, a demultiplexer (DEMUX) 280 demultiplexes the information corresponding to each of the layers and transmits the result to the decoding unit 200*a* or 200*b* of each of the layers. The input bitstream may be decoded through a process that is the reverse of the process of the encoding device.

Each of the entropy decoding units 210 and 211 may perform entropy-decoding through the reverse of the entropy-coding process performed by the entropy coding unit of the encoding device. Among the pieces of information decoded by the entropy decoding units 210 and 211, information required to generate a prediction block is provided to the prediction units 250 and 251, and a residual, entropy-decoded by the entropy decoding unit, may be input to the rearrangement units 220 and 221.

Each of the entropy decoding units 210 and 211 may use at least one of CABAC and CAVLC, like the entropy coding units 160 and 161.

Each of the entropy decoding units 210 and 211 may decode information about intra-prediction and inter-prediction performed by the encoding device. Each of the entropy decoding units 210 and 211 includes a codeword mapping unit that has a codeword mapping table for generating an intra-prediction mode number from a received codeword. The codeword mapping table may be stored in advance, or may be generated adaptively. When a codeNum mapping table is used, a codeNum mapping unit for performing codeNum mapping may be additionally arranged.

Each of the rearrangement units 220 and 221 may rearrange the bitstream, entropy-decoded by the entropy decoding unit 210 or 211, based on the arrangement method used by the encoding unit. The coefficients, represented in one-dimensional vector form, may be rearranged as 2-dimensional block-type coefficients by being reconstructed. Each of the rearrangement units 220 and 221 receives the information about the coefficient scanning method performed by the encoding unit, and may rearrange the coefficients using a method in which inverse scanning is performed based on the sequence of scanning performed by the encoding unit.

Each of the inverse-quantization units 230 and 231 may perform inverse quantization based on the quantization parameter provided by the encoding device and the rearranged coefficients of the block.

Each of the inverse-transform units 240 and 241 may perform inverse DCT or inverse DST, which correspond to DCT and DST performed by the corresponding transform unit 130 or 131, on the result of quantization performed by the encoding device. The inverse-transform may be performed in transmission units determined by the encoding device. In the transform unit of the encoding device, DCT and DST may be selectively performed according to multiple pieces of information, such as the prediction method, the size of the current block, the prediction direction, and the like. The inverse-transform unit 240 or 241 of the decoding device may perform inverse transform based on the information about the transform performed by the transform unit of the encoding device. Transform may be performed based on a coding block rather than a transform block.

Each of the prediction units 250 and 251 may generate a prediction block based on information about the generation of the prediction block, provided by the entropy decoding units 210 and 211, and information about previously decoded blocks or pictures, provided from the corresponding memory 270 or 271.

Each of the prediction units 250 and 251 may include a prediction unit determination unit, an inter-prediction unit, and an intra-prediction unit.

The prediction unit determination unit receives various information, including prediction unit information input from the entropy decoding unit, prediction mode information about an intra-prediction method, motion prediction information about an inter-prediction method, and the like, separates a prediction block from a current coding block, and determines whether the prediction block performs intra-prediction or inter-prediction.

The inter-prediction unit may perform inter-prediction of the current prediction block based on information included in at least one of the picture preceding and the picture following the current picture, which includes the current prediction block, using information required for inter-prediction of the current prediction block provided by the encoding device. In order to perform inter-prediction, it may be determined whether the method used as the motion prediction method of the prediction block included in the coding block based on the corresponding coding block is a skip mode, a merge mode, or a mode (AMVP mode) using a Motion vector Predictor (MVP).

The intra-prediction unit may generate a prediction block based on information about reconstructed pixels in the current picture. When the prediction block is a prediction block on which intra-prediction is performed, intra-prediction may be performed based on the intra-prediction mode information about the prediction block, provided by the encoding device. The intra-prediction unit may include an MDIS filter for performing filtering on reference pixels of the current block, a reference pixel interpolation unit for generating reference pixels in units smaller than a single pixel by interpolating the reference pixels, and a DC filter for generating a prediction block through filtering when the prediction mode of the current block is a DC mode.

The prediction unit 250 of the decoding unit 200*a* of the upper layer may further include an inter-layer prediction unit for performing inter-layer prediction, in which the upper layer is predicted using information relating to the lower layer.

The inter-layer prediction unit may perform inter-layer prediction by using intra-prediction mode information, motion information, etc.

The inter-layer prediction is implemented such that prediction of a current block of the upper layer is performed by adopting a lower layer picture as a reference picture and using motion information about the picture of the lower layer (reference layer).

In the inter-layer prediction, a picture of the reference layer, which is used as a reference picture, may be sampled suitably for the resolution of a current layer. In addition, the motion information may include the motion vector and reference index. At this point, a motion vector value for the reference layer picture may be set as (0, 0).

As an example of the inter-layer prediction, a prediction method for using the lower layer picture as a reference picture is described, but is not limited thereto. The inter-layer prediction unit 123 may additionally perform an inter-layer texture prediction, an inter-layer motion prediction, an inter-layer syntax prediction, and an inter-layer residual prediction, etc.

The inter-layer texture prediction may derive texture of a current layer based on texture of the reference layer. The reference layer texture may be sampled suitably for the resolution of the current layer, and the inter-layer prediction unit may predict the current layer texture based on the sampled texture. The inter-layer motion prediction may derive a motion vector of the current layer based on the motion vector of the reference layer. Here, the motion vector of the reference layer may be scaled suitably for the resolution of the current layer. In the inter-layer syntax prediction, current layer syntax may be predicted based on the reference layer syntax. For example, the inter-layer prediction unit 123 may use the reference layer syntax as current layer syntax. In addition, in the inter-layer residual prediction, the picture of the current layer may be reconstructed by using a difference between a reconstructed image of the reference layer and a reconstructed image of the current layer.

The reconstructed block or picture may be provided to each of the filter units 260 and 261. Each of the filter units 260 and 261 may include a deblocking filter and an offset correcting unit.

Information on whether a deblocking filter is applied to a corresponding block or picture and information on whether a strong filter or a weak filter is applied, when the deblocking filter is applied, may be received from the encoding device. The deblocking filter of the decoding device may receive deblocking filter-related information provided from the encoding device and the decoding device may perform deblocking filtering on a corresponding block.

The offset correction unit may perform offset correction on a reconstructed image based on the type of the offset correction and offset value information applied to an image at the time of coding.

Each of the memories 270 and 271 may store the reconstructed picture or block to allow them to be used as the reference picture or the reference block and may also output the reconstructed picture.

The encoding device and decoding device may perform encoding on three layers or more, not on two layers, and in this case, the coding unit and the decoding unit for the upper layer may be provided in plural numbers in correspondence to the number of upper layers.

In scalable video coding (SVC) for supporting a multi-layer structure, there is association between layers. When prediction is performed by using this association, data duplication elements may be removed and image coding performance may be improved.

Accordingly, when a picture (i.e. an image) of a current layer (i.e. an enhancement layer) to be encoded/decoded is predicted, inter-layer prediction by using information of another layer may be performed as well as inter prediction or intra-prediction using information of the current layer.

When the inter layer prediction is performed, prediction samples for the current layer may be generated by using a decoded picture of a reference layer, which is used for inter-layer prediction, as a reference picture.

In this case, since at least one of the spatial resolution, temporal resolution, and image quality may differ between the current layer and the reference layer (due to the difference in scalability between the layers), the decoded picture of the reference layer is resampled to be adapted to the scalability of the current layer, and may then be used as the reference picture for the inter-layer prediction of the current layer. "Resampling" means up-sampling or down-sampling the samples of the reference layer picture to match the picture size of the current layer picture.

In this specification, the current layer is the layer on which encoding or decoding is performed, and may be an enhancement layer or an upper layer. The reference layer is the layer that is referred to for inter-layer prediction of the current layer, and may be a base layer or a lower layer. The picture of the reference layer (that is, the reference picture) used for inter-layer prediction of the current layer may be called an inter-layer reference picture or a reference picture between layers.

Figure 3:
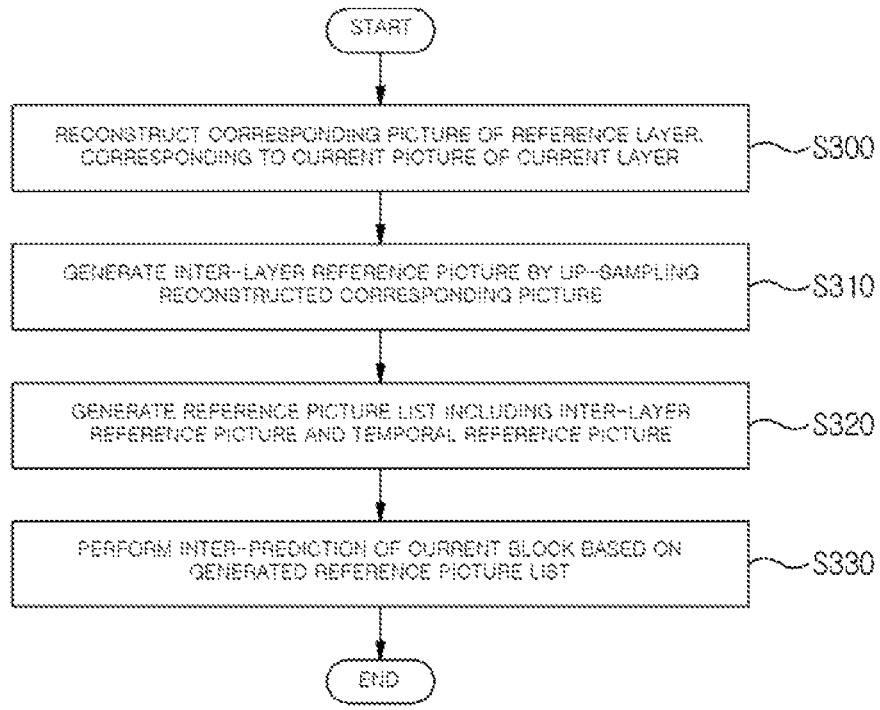
FIG. 3 is a flowchart showing a procedure for performing inter-prediction of a current layer using the corresponding picture of a reference layer according to an embodiment to which the present invention is applied.

FIG. 3 is a flowchart showing a procedure for performing inter-prediction of a current layer using the corresponding picture of a reference layer according to an embodiment to which the present invention is applied.

Referring to FIG. 3, the corresponding picture of the reference layer, which corresponds to the current picture of the current layer, may be reconstructed (S300).

The reference layer may mean another enhancement layer, the resolution of which is lower than that of the base layer or the current layer. The corresponding picture may mean a picture located in the same time slot as the current picture of the current layer.

For example, the corresponding picture may be a picture having the same Picture Order Count (POC) information as the current picture of the current layer. The corresponding picture may belong to the same Access Unit (AU) as the current picture of the current layer. The corresponding picture may have the same temporal level identifier (TemporalID) as the current picture of the current layer. Here, the temporal level identifier may mean an identifier for specifying each of multiple layers that are scalably coded according to the temporal resolution.

An inter-layer reference picture may be generated by up-sampling the corresponding picture reconstructed at step S300 (S310).

Here, the inter-layer reference picture may be used as a reference picture for inter-layer prediction of the current picture. The current picture of the current layer may use a single inter-layer reference picture or multiple inter-layer reference pictures.

For example, the inter-layer reference picture may include at least one of a first inter-layer reference picture and a second inter-layer reference picture. The first inter-layer reference picture may mean a reference picture, on which filtering is performed on the integer position thereof, and the second inter-layer reference picture may mean a reference picture, on which filtering is not performed on the integer position thereof. Here, the integer position may mean an integer pixel of the up-sampled corresponding picture. Alternatively, the integer position may mean the position having a phase of 0 (i.e. the position of an integer pixel corresponding to a multiple of n after interpolation) when, in an up-sampling procedure, interpolation is performed in units of a pixel less than or equal to an integer pixel, that is, in units of 1/n pixel, and then n phases are generated. Filtering on the integer position may be performed using neighboring integer positions. The neighboring integer positions may be located in the same row or column as the currently filtered integer position. The neighboring integer positions may include multiple integer positions belonging to the same row or column. Here, the multiple integer positions may be sequentially arranged in the same column or row. A detailed up-sampling method will be described later with reference to FIG. 4.

A reference picture list including the inter-layer reference picture generated at step S310 and a temporal reference picture may be generated (S320).

First, the reference picture list may include reference pictures belonging to the same layer as the current picture (hereinafter referred to as 'temporal reference pictures'). The temporal reference pictures may mean pictures having a output order (e.g. picture order count: POC) that is different from that of the current picture. The method for generating a reference picture list composed of temporal reference pictures will be described later with reference to FIGS. 5 to 7.

Meanwhile, when inter-layer prediction of the current picture is performed, the reference picture list may further include an inter-layer reference picture. That is, in a multi-layer structure (e.g. in scalable video coding or multiview video coding), not only the reference layer of the same layer, but also the reference picture of another layer, may be used as the reference picture of the enhancement layer.

More specifically, a picture belonging to the reference layer may be used as a reference picture. Here, the reference layer may be identified by a reference layer identifier (RefPiclayerId). The reference layer identifier may be derived based on the syntax inter_layer_pred_layer_idc (hereinafter referred to as an 'inter-layer indicator') of a slice header. The inter-layer indicator may mean the layer of the picture used by the current picture so as to perform inter-layer prediction. In this way, the reference picture list including the inter-layer reference picture of the reference layer, specified by the reference layer identifier, may be generated. This operation will be described later with reference to FIGS. 8 to 12.

Meanwhile, as described at step S310, the inter-layer reference picture may include at least one of a first inter-layer reference picture and a second inter-layer reference picture. Therefore, a reference picture list including any one of the first inter-layer reference picture and the second inter-layer reference picture, or a reference picture list both of the first inter-layer reference picture and the second inter-layer reference picture may be generated.

To selectively use the first inter-layer reference picture and the second inter-layer reference picture, whether to use, on a picture basis, both or either of the first and second inter-layer reference pictures may be selected. Furthermore, when either of the first and second inter-layer reference pictures is selected and used, which one of the two pictures is to be used may be selected. For this, the encoding device may signal information about which one of the two pictures is to be used.

Alternatively, for the selective use of the pictures, a reference index may be used. More specifically, using a reference index on a prediction block basis, only the first inter-layer reference picture or only the second inter-layer reference picture may be selected, or both of the first and second inter-layer reference pictures may be selected.

When an inter-layer reference picture is added to the reference picture list, there is a need to change the range of the number of reference pictures arranged in the reference picture list or the number of reference indices allocated to each reference picture.

Here, it is assumed that the range of num_ref_idx_l0_active_minus1 and num_ref_idx_l1_active_minus1, which are syntax elements of the slice header that indicates the maximum value of reference indices of the reference picture list for the base layer, has values from 0 to 14.

When one of the first inter-layer reference picture and the second inter-layer reference picture is used, the range of num_ref_idx_l0_active_minus1 and num_ref_idx_l1_active_minus1, which are syntax elements indicating the maximum value of the reference indices of the reference picture list for the current layer, may be defined as the range of values from 0 to 15. Alternatively, even if both of the first and second inter-layer reference pictures are used, when the two inter-layer reference pictures are added to different reference picture lists, the range of num_ref_idx_l0_active_minus1 and num_ref_idx_l1_active_minus1 may be defined as the range of values from 0 to 15.

For example, when the number of temporal reference pictures in reference picture list L0 is 15, if the first or second inter-layer reference picture is added to the reference picture list, a total of 16 reference pictures are present, and the value of num_ref_idx_l0_active_minus1 is 15.

Alternatively, when both of the first and second inter-layer reference pictures are used, or when two inter-layer reference pictures are added to the same reference picture list, the range of num_ref_idx_l0_active_minus1 and num_ref_idx_l1_active_minus1, which are syntax elements indicating the maximum value of the reference indices of the reference picture list for the current layer, may be defined as the range of values from 0 to 16.

For example, when the number of temporal reference pictures in the reference picture list L0 is 15, and a first inter-layer reference picture and a second inter-layer reference picture are added to the reference picture list L0, a total of 17 reference pictures are present, and the value of num_ref_idx_l0_active_minus1 is 16.

Inter-prediction of the current layer may be performed based on the reference picture list, generated at step S320 (S330).

More specifically, a reference picture corresponding to the reference index of the current block is selected from the reference picture list. The selected reference picture may be a temporal reference picture present in the same layer as the current block or an inter-layer reference picture up-sampled from the corresponding picture of the reference layer.

A reference block in the reference picture is specified based on the motion vector of the current block, and a sample value or texture information of the current block may be predicted using a reconstructed sample value or texture information of the specified reference block. In this case, when the reference picture corresponding to the reference index of the current block is an inter-layer reference picture, the reference block may be a block located at the same position as the current block. For this, when the reference picture of the current block is an inter-layer reference picture, the motion vector of the current block may be set to (0,0).

Figure 4:
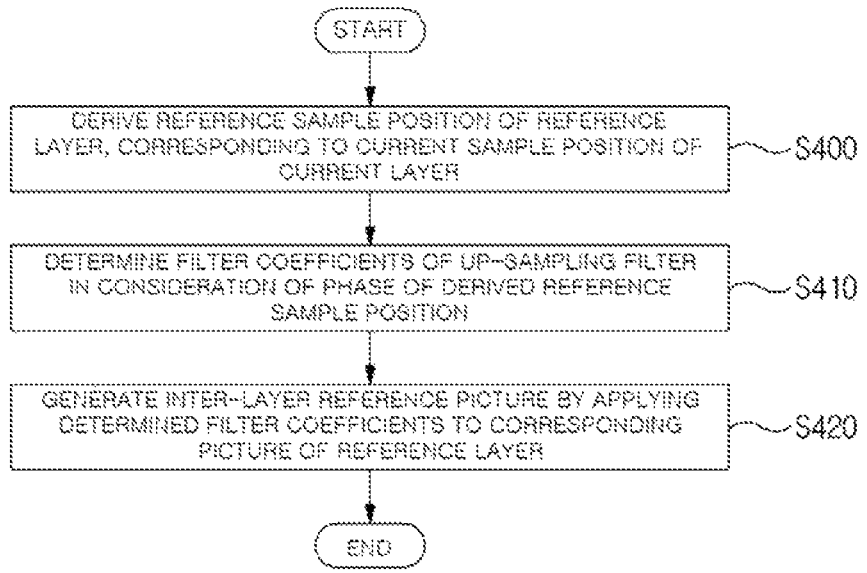
FIG. 4 is a flowchart showing a method for up-sampling the corresponding picture of a reference layer according to an embodiment to which the present invention is applied.

FIG. 4 is a flowchart showing a method for up-sampling the corresponding picture of a reference layer according to an embodiment to which the present invention is applied.

Referring to FIG. 4, a reference sample position of a reference layer, which corresponds to the current sample position of a current layer, may be derived (S400).

Since the current layer and the reference layer may be different from each other in resolution, the reference sample position corresponding to the current sample position may be derived in consideration of the difference in resolution between the layers. That is, the aspect ratios between the picture of the current layer and the picture of the reference layer may be taken into consideration. Further, since the size of the up-sampled picture of the reference layer may not match the size of the picture of the current layer, an offset required to correct such a difference may be required.

For example, the reference sample position may be derived in consideration of a scale factor and the offset of the up-sampled reference layer.

Here, the scale factor may be calculated based on the width-length ratio between the current picture of the current layer and the corresponding picture of the reference layer.

The up-sampled reference layer offset may mean information about a difference between the positions of any one sample located at the edge of the current picture and any one sample located at the edge of the inter-layer reference picture. For example, the up-sampled reference layer offset may include information about the difference between the horizontal/vertical positions of a top-left sample of the current picture and a top-left sample of the inter-layer reference picture and the difference between the horizontal/vertical positions of a bottom-right sample of the current picture and a bottom-right sample of the inter-layer reference picture.

The up-sampled reference layer offset may be obtained from a bitstream. For example, the up-sampled reference layer offset may be obtained from at least one of a video parameter set, a sequence parameter set, a picture parameter set, and a slice header.

Filter coefficients of an up-sampling filter may be determined in consideration of a phase at the reference sample position derived at step S400 (S410).

Here, as the up-sampling filter, either a fixed up-sampling filter or an adaptive up-sampling filter may be used.

1. Fixed Up-Sampling Filter

The fixed up-sampling filter may have preset filter coefficients without considering features of video. A tap filter may be used as the fixed up-sampling filter, which may be defined with respect to each of a luminance (luma) component and a chrominance (chroma) component. An up-sampling filter having a precision of a 1/16 of a sample unit will be described with reference to Tables 1 and 2.

TABLE 1

| Phase p | Coefficients of interpolation filter ||||||||
|---|---|---|---|---|---|---|---|---|
| | f[p, 0] | f[p, 1] | f[p, 2] | f[p, 3] | f[p, 4] | f[p, 5] | f[p, 6] | f[p, 7] |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −3 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Table 1 defines filter coefficients of the fixed up-sampling filter for the luma component.

As shown in Table 1, in the case of up-sampling the luma component, an 8-tap filter is applied. In other words, interpolation may be performed by using a reference sample of the reference layer, which corresponds to the current sample of the current layer, and neighboring samples adjacent to the reference sample. Here, the neighboring samples may be specified according to a direction of the interpolation. For example, when the interpolation is performed in the horizontal direction, the neighboring samples may include 3 consecutive samples in the left and 4 consecutive samples in the right with respect to the reference sample. Alternatively, when the interpolation is performed in the vertical direction, the neighboring samples may include 3 consecutive samples toward the top end and 4 consecutive samples toward the bottom end with respect to the reference sample.

In addition, since the interpolation is performed with the accuracy of the 1/16 sample unit, a total of 16 phases exist. This is for supporting resolutions of various magnifications of 2 and 1.5 times.

In addition, the fixed up-sampling filter may use a filter having different coefficients for each phase p. Except for the case where the phase p is 0, the magnitude of each filter coefficient may be defined to be in a range of 0 to 63. This means that filtering is performed with 6-bit precision. Here, the phase p of 0 means an integer sample position of n-multiple, when the interpolation is performed in a 1/n sample unit.

TABLE 2

| Phase p | Coefficients of interpolation filter ||||
|---|---|---|---|---|
| | f[p, 0] | f[p, 1] | f[p, 2] | f[p, 3] |
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

Table 2 defines filter coefficients of the fixed up-sampling filter for the chroma component.

As shown in Table 2, in a case of up-sampling the chroma component, unlike the case of the luma component, a 4-tap filter may be applied. In other words, interpolation may be performed by using a reference sample of the reference layer, which corresponds to a current sample, and neighboring samples adjacent to the reference sample. Here, the neighboring samples may be specified according to a direction of the interpolation. For example, when the interpolation is performed in the horizontal direction, the neighboring samples may include 1 sample in the left and 2 consecutive samples in the right with respect to the reference sample. Alternatively, when the interpolation is performed in the vertical direction, the neighboring samples may include 1 sample toward the top end and 2 consecutive samples toward the bottom end with respect to the reference sample.

Furthermore, similarly to the case of the luma component, since the interpolation is performed with the accuracy of 1/16 sample unit, a total of 16 phases exist and different coefficients may be used for each phase p. Except for a case where the phase p is 0, the magnitude of each filter coefficient may be defined to be in a range of 0 to 62. This means that the filtering is also performed with 6-bit precision.

In the foregoing, the cases where the 8-tap filter is applied for the luma component and the 4-tap filter is applied for the chroma component are exemplified, but the present invention is not limited thereto and the order of a tap filter may be variably determined in consideration of a coding efficiency.

2. Adaptive Up-Sampling Filter

In an encoder, optimal filter coefficients are determined by considering features of an image without using the fixed filter coefficients, and are signaled to be transmitted to a decoder. Like this, an adaptive up-sampling filter uses filter coefficients that are adaptively determined. Since the features of an image vary in a picture unit, coding efficiency may be improved when an adaptive up-sampling filter capable of desirably representing the features of the image is used, rather than the fixed up-sampling filter for all cases.

An inter-layer reference picture may be generated by applying the filter coefficients determined at step S410 to the corresponding picture of the reference layer (S420).

In detail, interpolation may be performed by applying the determined filter coefficients of the up-sampling filter to samples of the corresponding picture. Here, the interpolation is primarily performed in the horizontal direction, and then secondarily performed in the vertical direction on the samples generated after the horizontal interpolation.

Figure 5:
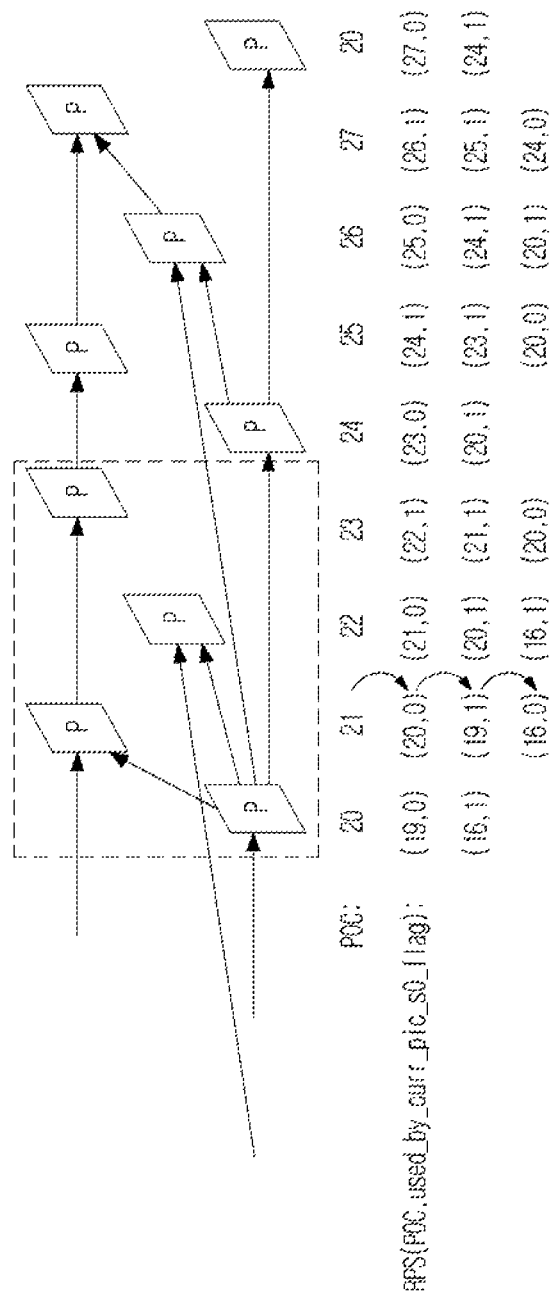
FIG. 5 is a diagram showing a method for specifying a short-term reference picture stored in a decoding picture buffer.

FIG. 5 is a diagram showing a method for specifying a short-term reference picture stored in a decoding picture buffer.

Temporal reference pictures may be stored in the decoding picture buffer (DPB) and may be used as reference pictures when they are required for inter-prediction of a current picture. The temporal reference pictures stored in the decoding picture buffer may include short-term reference pictures. Such a short-term reference picture denotes a picture, the POC value of which does not have a large difference from that of the current picture.

Information for specifying a short-term reference picture to be stored in the decoding picture buffer in a current view is composed of the output order (POC) of reference pictures and a flag indicating whether the corresponding picture is directly referred to by the current picture (e.g. used_by_curr_pic_s0_flag, used_by_curr_pic_s1_flag), which are collectively called a reference picture set. In detail, when the value of used_by_curr_pic_s0_flag[i] is 0, if an i-th short-term reference picture in the short-term reference picture set has a output order (POC) value less than that of the current picture, it means that the i-th short-term reference picture is not used as the reference picture of the current picture. Further, when the value of used_by_curr_pic_s1_flag[i] is 0, if an i-th short-term reference picture in the short-term reference picture set has a output order (POC) value greater than that of the current picture, it means that the i-th short-term reference picture is not used as the reference picture of the current picture.

Referring to FIG. 5, in the case of a picture having a POC value of 26, a total of three pictures (i.e. pictures having POC values of 25, 24, and 20) may be used as short-term reference pictures for inter-prediction. However, since the value of used_by_curr_pic_s0_flag of the picture having a POC of 25 is 0, the picture having a POC value of 25 is not directly used for inter-prediction of the picture having a POC value of 26.

In this way, short-term reference pictures may be specified based on both the output order (POC) of the reference pictures and the flag indicating whether the corresponding picture is used as a reference picture by the current picture.

Meanwhile, pictures, which do not appear in the reference picture set for the current picture, may be marked with an indicator indicating that the pictures are not used as reference pictures (e.g. 'unused for reference'), and may then be removed from the decoding picture buffer.

FIG. 6 illustrates a method for specifying a long-term reference picture according to an embodiment to which the present invention is applied.

Since a long-term reference picture has a large difference in POC from a current picture, it may be represented using the Least significant bit (LSB) and Most Significant Bit (MSB) of a POC value.

Therefore, the POC value of the long-term reference picture may be derived using the LSB of the POC value of a reference picture, the POC value of the current picture, and a difference between the MSB of the POC value of the current picture and the MSB of the POC value of the reference picture.

For example, it is assumed that the POC of the current picture is 331 and a maximum value that can be represented by LSB is 32, and that a picture having a POC value of 308 is used as a long-term reference picture.

In this case, the POC value of the current picture, that is, 331, may be represented by 32*10+11, wherein 10 is the MSB value, and 11 is the LSB value. The POC value of the long-term reference picture, that is, 308, may be represented by 32*9+20, wherein 9 is the MSB value and 20 is the LSB value. Here, the POC value of the long-term reference picture may be derived using an equation shown in FIG. 6.

Figure 7:
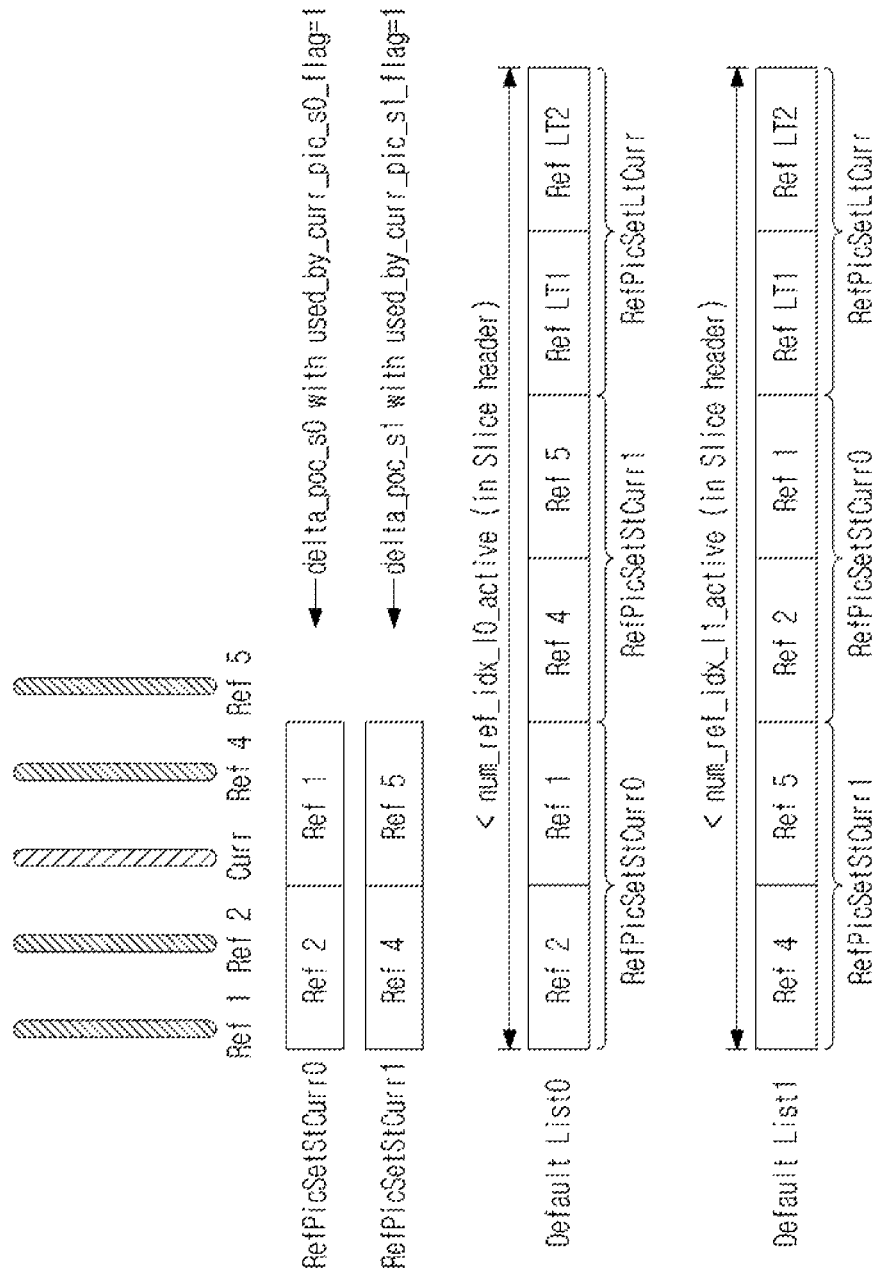
FIG. 7 illustrates a method for constructing a reference picture list using a short-term reference picture and a long-term reference picture according to an embodiment to which the present invention is applied.

FIG. 7 illustrates a method for constructing a reference picture list using a short-term reference picture and a long-term reference picture according to an embodiment to which the present invention is applied.

Referring to FIG. 7, a reference picture list including temporal reference pictures may be generated in consideration of information about whether temporal reference pictures are short-term reference pictures and the POC values of short-term reference pictures. Here, the reference picture list may include at least one of reference picture list 0 for L0 prediction and reference picture list 1 for L1 prediction.

More specifically, the reference picture list 0 may be arranged in the sequence of a short-term reference picture (RefPicSetCurr0) having a POC value less than that of the current picture, a short-term reference picture (RefPicSetCurr1) having a POC value greater than that of the current picture, and a long-term reference picture (RefPicSetLtCurr).

Meanwhile, the reference picture list 1 may be arranged in the sequence of a short-term reference picture (RefPicSetCurr1) having a POC value greater than that of the current picture, a short-term reference picture (RefPicSet- Curr0) having a POC value less than that of the current picture, and a long-term reference picture (RefPicSetLtCurr).

Further, in order to improve encoding efficiency for reference indices of temporal reference pictures, multiple temporal reference pictures included in the reference picture list may be rearranged (modified). This may be adaptively performed based on a list modification flag (list_modification_present_flag). Here, the list modification flag denotes information for specifying whether to modify reference pictures in the reference picture list. The list modification flag may be individually signaled for the reference picture list 0 and for the reference picture list 1.

For example, reference pictures in the reference picture list are not modified when the value of the list modification flag (list_modification_present_flag) is 0, and the reference pictures in the reference picture list may be modified only when the value of the list modification flag (list_modification_present_flag) is 1.

When the value of the list modification flag (list_modification_present_flag) is 1, the reference pictures in the reference picture list may be modified using list entry information (list_entry[i]). Here, 'list entry information (list_entry[i])' may specify the reference index of a reference picture located at the current position (i.e. i-th entry) in the reference picture list.

More specifically, a reference picture corresponding to the list entry information (list_entry[i]) in the generated reference picture list is specified, and the specified reference picture may be rearranged in the i-th entry in the reference picture list.

As many pieces of list entry information as the number of reference pictures included in the reference picture list or as the maximum value of the reference index of the reference picture list may be obtained. Also, the list entry information may be obtained in consideration of the slice type of the current picture. That is, when the slice type of the current picture is P slice, list entry information(list_entry_l0[i]) for reference picture list 0 may be obtained, whereas when the slice type of the current picture is B slice, list entry information (list_entry_l1[i]) for reference picture list 1 may be additionally obtained.

FIGS. 8 to 12 illustrate a method for constructing a reference picture list in a multi-layer structure according to embodiments to which the present invention is applied.

Figure 8:
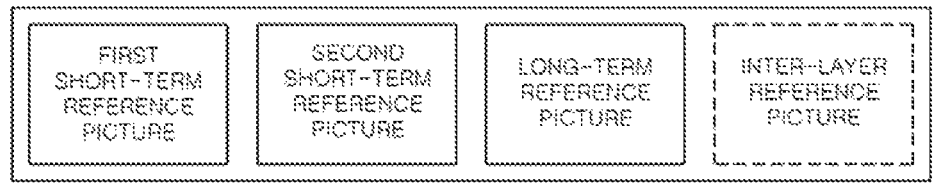
FIGS. 8 to 12 illustrate a method for constructing a reference picture list in a multi-layer structure according to embodiments to which the present invention is applied.
Figure 8:

Referring to FIG. 8, reference picture list 0 in a multilayer structure may be constructed in the sequence of a short-term reference picture (hereinafter referred to as a 'first short-term reference picture') having a POC value less than that of a current picture, a short-term reference picture (hereinafter referred to as a 'second short-term reference picture') having a POC value greater than that of the current picture, and a long-term reference picture. Reference picture list 1 may be constructed in the sequence of a second short-term reference picture, a first short-term reference picture, and a long-term reference picture. Further, an inter-layer reference picture may be added to the position subsequent to the long-term reference picture in each of the reference picture list 0 and the reference picture list 1.

However, in the multi-layer structure, when a picture in an enhancement layer and a picture in a base layer are similar to each other, the enhancement layer may frequently use the inter-layer reference picture of the base layer. In this case, when the inter-layer reference picture is added to the last position of the reference picture list, encoding performance of the reference picture list may be deteriorated. Therefore, as shown in FIGS. 9 to 12, encoding performance of the reference picture list may be improved by adding the inter-layer reference picture to the position prior to the long-term reference picture.

Figure 9:
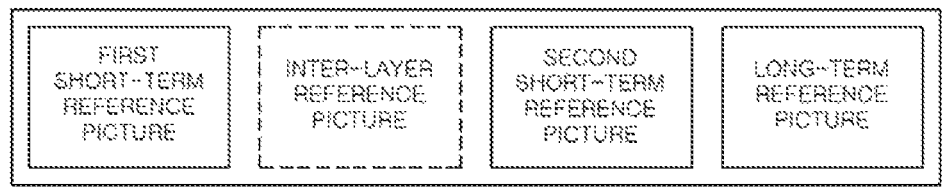
Figure 9:

Referring to FIG. 9, an inter-layer reference picture may be arranged between short-term reference pictures in the reference picture list. In a multi-layer structure, reference picture list 0 may be constructed in the sequence of a first short-term reference picture, an inter-layer reference picture, a second short-term reference picture, and a long-term reference picture. Reference picture list 1 may be constructed in the sequence of a second short-term reference picture, an inter-layer reference picture, a first short-term reference picture, and a long-term reference picture.

Figure 10:
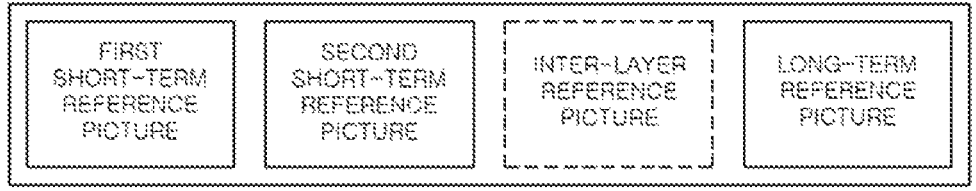
Figure 10:
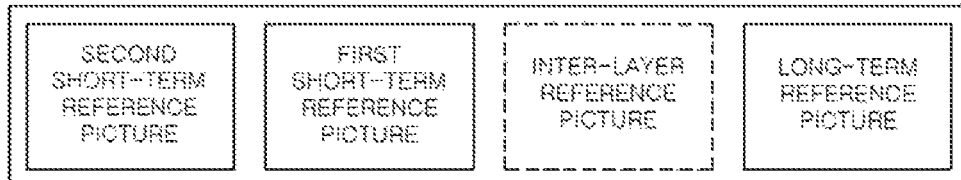

Alternatively, an inter-layer reference picture may be arranged between a short-term reference picture and a long-term reference picture in the reference picture list. Referring to FIG. 10, reference picture list 0 in a multi-layer structure may be constructed in the sequence of a first short-term reference picture, a second short-term reference picture, an inter-layer reference picture, and a long-term reference picture. Reference picture list 1 may be constructed in the sequence of a second short-term reference picture, a first short-term reference picture, an inter-layer reference picture, and a long-term reference picture.

Figure 11:
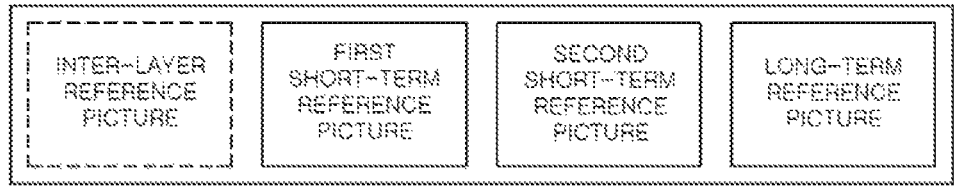
Figure 11:
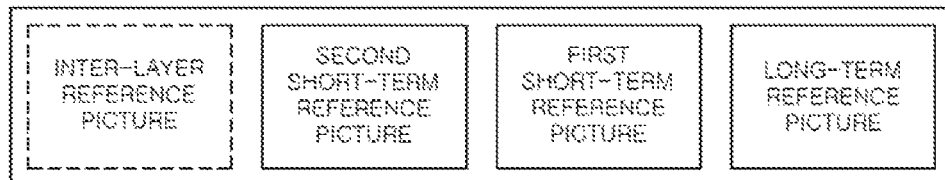

Alternatively, an inter-layer reference picture may be arranged prior to a short-term reference picture in the reference picture list. Referring to FIG. 11, reference picture list 0 in a multi-layer structure may be constructed in the sequence of an inter-layer reference picture, a first short-term reference picture, a second short-term reference picture, and a long-term reference picture. Reference picture list 1 may be constructed in the sequence of an inter-layer reference picture, a second short-term reference picture, a first short-term reference picture, and a long-term reference picture.

Alternatively, an inter-layer reference picture may be added to the reference picture list based on a list order index (list_order_idx). Here, the list order index may specify the position to which an inter-layer reference picture is to be added in the reference picture list.

Figure 12:
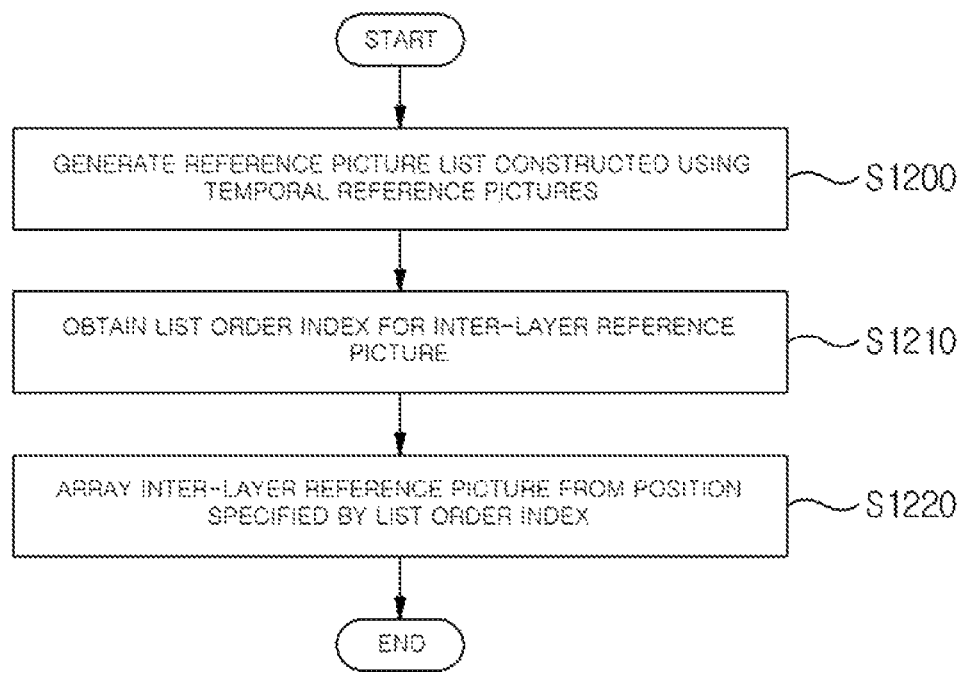

More specifically, referring to FIG. 12, a reference picture list constructed using temporal reference pictures may be generated (S1200).

For example, reference picture list 0 may be constructed in the sequence of a first short-term reference picture, a second short-term reference picture, and a long-term reference picture, and reference picture list 1 may be constructed in the sequence of a second short-term reference picture, a first short-term reference picture, and a long-term reference picture.

Meanwhile, the list order index for the inter-layer reference picture may be obtained (S1210).

The list order index may be obtained from at least one of the video parameter set, sequence parameter set and slice header of a bitstream.

Alternatively, the list order index may be derived from the number of short-term reference pictures or the maximum value of the reference indices of the short-term reference pictures. For example, the list order index may be set to a value identical to the number of short-term reference pictures or to a value obtained by adding 1 to the maximum value of the reference indices of the short-term reference pictures. Here, the short-term reference pictures may mean short-term reference pictures having POC values less than that of the current picture.

The inter-layer reference picture may be primarily arranged at the position specified by the obtained list order index (S1220).

Meanwhile, in FIGS. 8 to 12, as an example in which a reference picture list is constructed, the case where a single short-term reference picture having a POC value less than that of the current picture, a single short-term reference picture having a POC value greater than that of the current picture, a single long-term reference picture, and a single inter-layer reference picture are individually present is illustrated. However, this example merely shows the sequence in which reference pictures are arranged, and it is apparent that multiple short-term reference pictures (i.e. a short-term reference picture set), long-term reference pictures (i.e. a long-term reference picture set), and inter-layer reference pictures (i.e. an inter-layer reference picture set) may be used.

Furthermore, when multiple inter-layer reference pictures are used, the multiple inter-layer reference pictures may be separated into a first inter-layer reference picture set and a second inter-layer reference picture set, and thus the reference picture list may be constructed.

More specifically, the first inter-layer reference picture set may be arranged between the first short-term reference picture and the second short-term reference picture, and the second inter-layer reference picture set may be arranged subsequent to the long-term reference picture. However, the present invention is not limited to the examples, and may include all possible embodiments that may be derived from combinations of the embodiments shown in FIGS. 8 to 12.

Here, the first inter-layer reference picture set may mean reference pictures on which filtering has been performed on the integer position thereof, and the second inter-layer reference picture set may mean reference pictures on which filtering has not been performed on the integer position thereof.

Alternatively, the first inter-layer reference picture set may mean reference pictures of a reference layer having a reference layer identifier (RefPiclayerId) smaller than the layer identifier (CurrlayerId) of the current layer, and the second inter-layer reference picture set may mean the reference pictures of a reference layer having a reference layer identifier (RefPiclayerId) larger than the layer identifier (CurrlayerId) of the current layer.

INDUSTRIAL APPLICABILITY

The present invention may be used to code video signals having a multi-layer structure.

The invention claimed is:

1. A multi-layer video signal decoding method, comprising:
decoding a corresponding picture of a reference layer that corresponds to a current picture of a current layer;
generating an inter-layer reference picture for inter-layer prediction of the current picture using the decoded corresponding picture;
generating a reference picture list including a temporal reference picture and the inter-layer reference picture; and
performing inter-prediction of the current picture based on the reference picture list, wherein:
the temporal reference picture comprises at least one of a first short-term reference picture, a second short-term reference picture and a long-term reference picture,
the inter-layer reference picture comprises at least one of a first inter-layer reference picture and a second inter-layer reference picture,
the first inter-layer reference picture is arranged, in the reference picture list, between the first short-term reference picture, and the second short-term reference picture,
the second inter-layer reference picture is arranged, in the reference picture list, subsequent to the long-term reference picture, and wherein:
the first short-term reference picture means a short-term reference picture having a Picture Order Count (POC) value less than that of the current picture, and the second short-term reference picture means a short-term reference picture having a POC value greater than that of the current picture.

2. The multi-layer video signal decoding method of claim 1, wherein:
the first short-term reference picture means a short-term reference picture having a Picture Order Count (POC) value less than that of the current picture, and the second short-term reference picture means a short-term reference picture having a POC value greater than that of the current picture.

3. The multi-layer video signal decoding method of claim 2, wherein:
the first inter-layer reference picture has a view order lower than a view order of the current picture and the second inter-layer reference picture ahs a view order higher than a view order of the current picture, and
the reference picture list is constructed in a sequence of the first short-term reference picture, the first inter-layer reference picture, the second short-term reference picture, the long-term reference picture and the second inter-layer reference picture.

4. The multi-layer video signal decoding method of claim 2, wherein:
the first inter-layer reference picture has a view order higher than a view order of the current picture and the second inter-layer reference picture has a view order lower than a view order of the current picture, and
the reference picture list is constructed in a sequence of the second short-term reference picture, the first inter-layer reference picture, the first short-term reference picture, the long-term reference picture and the second inter-layer reference picture.

* * * * *